United States Patent
Duan

(10) Patent No.: US 11,511,455 B2
(45) Date of Patent: Nov. 29, 2022

(54) COMPOUND SAW

(71) Applicant: Ningbo Xiecheng Power Tools Co., Ltd., Ningbo (CN)

(72) Inventor: Bowen Duan, Ningbo (CN)

(73) Assignee: Ningbo Xiecheng Power Tools Co., Ltd., Ningbo (CN)

( * ) Notice: Subject to any disclaimer, the term of this patent is extended or adjusted under 35 U.S.C. 154(b) by 161 days.

(21) Appl. No.: 16/992,840

(22) Filed: Aug. 13, 2020

(65) Prior Publication Data

US 2021/0086392 A1  Mar. 25, 2021

(30) Foreign Application Priority Data

Sep. 25, 2019 (CN) .......................... 201921609135.2

(51) Int. Cl.
| | |
|---|---|
| B27B 5/16 | (2006.01) |
| B23D 45/04 | (2006.01) |
| B23D 45/06 | (2006.01) |
| B23D 59/02 | (2006.01) |
| B23D 47/12 | (2006.01) |
| B23D 47/02 | (2006.01) |
| B27G 19/04 | (2006.01) |

(52) U.S. Cl.
CPC ............ *B27B 5/165* (2013.01); *B23D 45/044* (2013.01); *B23D 45/062* (2013.01); *B23D 47/025* (2013.01); *B23D 47/123* (2013.01); *B23D 59/02* (2013.01); *B27G 19/04* (2013.01)

(58) Field of Classification Search
CPC .... B23D 45/042; B23D 45/044; B23D 45/06; B23D 45/061; B23D 45/062; B23D 47/025; B27B 5/165

USPC ... 83/471.3, 490, 491, 486.1, 522.19, 477.2, 83/478, 788, 794, 581; 144/286.1, 286.5
See application file for complete search history.

(56) References Cited

U.S. PATENT DOCUMENTS

| | | | | |
|---|---|---|---|---|
| 1,924,672 A | * | 8/1933 | Zachara | B27B 5/165 |
| | | | | 83/520 |
| 2,291,058 A | * | 7/1942 | Pohl | B23D 47/12 |
| | | | | 451/352 |
| 6,370,997 B1 | * | 4/2002 | Rugen | B23D 45/062 |
| | | | | 83/486.1 |

(Continued)

FOREIGN PATENT DOCUMENTS

| | | | | |
|---|---|---|---|---|
| DE | 572 481 | * | 3/1933 | ............. B27B 5/165 |
| DE | 583 655 | * | 9/1933 | ............. B27B 5/165 |

(Continued)

*Primary Examiner* — Ghassem Alie
(74) *Attorney, Agent, or Firm* — Wang Law Firm, Inc.

(57) ABSTRACT

A compound saw includes a base, a housing, a transmission component and a table, the rear end of the table is rotatably connected to the housing, and is engaged with the cutter head through the transmission component, so as to expose the cutter head out of the first cutting slit or out of the second cutting slit when the front end of the table swings upward and downward. The cutter head of the compound saw can be switched between the bench cutting mode and the miter cutting mode. Accordingly, on one hand, the structure for switching between modes is simple and does not require the cooperation of too many parts; on the other hand, the switchover can be realized simply by manually operating the movable bench, without too many operations.

14 Claims, 8 Drawing Sheets

(56) References Cited

U.S. PATENT DOCUMENTS

| | | | | |
|---|---|---|---|---|
| 7,752,951 B2 * | 7/2010 | Ouellette | ................ | B27B 5/165 83/477.2 |
| 2006/0048617 A1 * | 3/2006 | Gehret | ...................... | B27B 5/29 83/473 |
| 2010/0269660 A1 * | 10/2010 | Janson | ................... | B23Q 11/06 83/477.2 |

FOREIGN PATENT DOCUMENTS

| | | | | |
|---|---|---|---|---|
| DE | 29 08 211 | * | 6/1980 | ............. B27B 5/165 |
| FR | 1297114 | * | 6/1962 | ......... B24B 27/0608 |
| FR | 2123954 | * | 9/1972 | ............. B27B 5/165 |

* cited by examiner

COMPOUND SAW

TECHNICAL FIELD OF THE INVENTION

The present invention relates to the technical field of electric saws, and in particular to a compound saw.

BACKGROUND OF THE INVENTION

As one kind of commonly used electric tools, compound saws have been widely applied in mechanical manufacturing and other fields. Compound saws can be switched between two modes, i.e., miter cutting and bench cutting, to meet different application requirements.

The bench cutting mode differs from the miter cutting mode in that the material is fed into the compound saw from different positions. When the compound saw is in the bench cutting mode, the material is fed from the bench on the upper side of the compound saw; and, when the compound saw in the miter cutting mode, the material is fed from the lower side of the compound saw.

To protect users, since the blade is always rotating when the compound saw is switched to any one of the bench cutting mode and the miter cutting mode, the blade on the upper side or the lower side may hurt users if the blade is not shielded properly. Therefore, during practical production, no blade is allowed to be exposed from the feeding port corresponding to the other mode. In the existing compound saws, the exposure of the blade is avoided by externally mounting a shield. When one of the two cutting modes is used, the corresponding shield is removed. This separate shield is inconvenient and unaesthetic, and the shield may be lost during busy cutting operations. Therefore, a Chinese patent CN2493347Y (Patent No. 01252824.2) disclosed a shield structure for a compound saw, wherein the compound saw drives a blade by rotating a frame. The shield moves together with the up-down movement of a bench. Thus, the shield can always shield the blade in both the bench cutting mode and the miter cutting mode, and the operation safety is ensured.

Although the blade can be easily shielded and exposed by the shield, the shield still has some disadvantages:

1. the structure for moving the shield is too complicated and needs the cooperation of multiple parts, so the cost is increased and it is inconvenient for subsequent maintenance; and 2. during the switchover between the bench cutting mode and the miter cutting mode, it is necessary to operate the frame to pull the blade, then operate the push pin and finally operate the bench, and the sequence of those steps cannot be changed; and, the operations are complicated and not so easy, and it will take a long period of time to master the operations.

SUMMARY OF THE INVENTION

A technical problem to be solved by the present invention is to provide a compound saw with simple structure, easy operation and good shield effect.

To solve the technical problem, the compound saw comprises a base, a housing having an internal chamber, a cutter head disposed inside the chamber, a transmission component and a table; wherein the housing has a front end and a rear end, the rear end of the housing is rotatably connected to the base, the front end of the housing is movable vertically relative to the base, so as to provide a cutting region below or above the housing; the housing has a first cutting slit at a bottom of the housing for the cutter head to pass through;

the transmission component is installed on a lateral face of the housing, and connected to the cutter head;

the table is disposed above the housing as a work platform, the table is engaged with the cutter head through the transmission component, and the table has a second cutting slit at a top of the table for the cutter head to pass through; the table has a front end and a rear end, the rear end of the table is rotatably connected to the housing.

when the front end of the table moves upward relative to the housing, so as to expose the cutter head out of the first cutting slit, the compound saw operates in a miter mode.

when the front end of the table moves downward relative to the housing, so as to expose the cutter head out of the second cutting slit, the compound saw operates in a platform mode.

To ensure that the movable bench can drive the head component to move together and switch the exposed state of the cutter head, preferably, the transmission component comprises a connecting rod having a first end and a second end, and a slide seat having a front end, a rear end, a middle portion and a rear portion which is rotatably connected to the housing, the slide seat rotates parallel the housing; the first end of the connecting rod is hinged to the table, the second end of the connecting rod is hinged to the rear end of the slide seat, and the front end of the slide seat is a free end.

To ensure the cutter head can work at both the miter mode and the platform mode, preferably, the compound saw further comprises a head component, the head component comprises a driver and the cutter head; the driver is mounted on the middle portion of the slide seat, and is movable vertically along with the slide seat driven by the table, so as to expose the cutter head out of the first cutting slit or second cutting slit; and the driver with an output end is engaged with the cutter head.

To ensure unimpeded rotation of the head component, preferably, the housing has an evading groove which allows the output end of the driver to pass therethrough and is capable of evading the output end of the driver during the rotation of the table relative to the housing.

Preferably, the evading groove is a curved arc groove curving toward the rear end of the housing.

To ensure that the movable bench can be locked at its position after rotation, preferably, the housing has a positioning hole for positioning the cutter head when the cutter head moves to a corresponding position, the positioning hole runs through a wall of the housing along the direction of the thickness of the housing; and correspondingly, the slide seat has a positioning column seat at the front end of the slide seat, a positioning column having a positioning tip matched with the positioning hole is movable disposed inside the positioning column seat, an elastic member is disposed out of the positioning column so as to force the positioning tip of the positioning column to insert into the positioning hole; the rear end of the positioning column extends out of the positioning column seat and connected to an operation handle.

Preferably, the housing comprises a first shell and a second shell disposed below the first shell; the chamber is located inside the first shell, and the second shell is hinged with the bottom of the first shell, and at least a portion of the second shell is capable of rotating upward and inserting into the chamber to protect the cutter head.

Preferably, the first shell has a movable protruding slider for guiding and positioning at the front side of the first shell, correspondingly, the second shell has a circular arc positioning groove at the front side of the second shell for receiving the protruding slider, so that, the cutter head in non-working area is hidden between the first shell and the second shell, and the cutter head in working area is exposed at the bottom of the second shell for cutting. The connecting format of the second shell and the first shell can ensure that, when switching to miter mode, the second shell encases the bottom of the cutter head throughout; when cutting, as the cut deepens, the second shell moves upward meanwhile, to ensure the cutter head expose enough cutting area.

To ensure that the cutter head above the housing not be exposed, preferably, the table has a protection component extended at the bottom of the table, the protection component at least partly located inside the chamber, the protection component is a hollow cover, covering the cutter head outside, connecting to the bottom of the table.

To ensure that the cutter head not be exposed during the process of extending on the second cutting slit, preferably, the housing has a connecting portion, extending out of the second cutting slit; a protection shield is disposed on the top of the table, rotatably connected to the connecting portion.

Preferably, the bottom of the second shell is curves upwardly from the front end to the rear end of the housing, and the first shell has a support component at the front end of the first shell extending downward, when the housing is in a horizontal position, the support component is capable of touching the base.

Preferably, cooling wind leaves are disposed on the middle portion of the slide seat, the cooling wind leaves are connected to the output of the driver. This design can cool the driver, so as to make the structure more compact.

Compared with the prior art, the present invention has the following advantages. The compound saw comprises a base, a housing, a transmission component and a table, wherein a first end of the table is connected to a first end of the housing in such a way that the first end of the table can rotate up and down, and the head component is linked with the table. In this way, by driving the head component to move by the table, the cutter head in the head component can extend out above the housing or under the first shield, so that the cutter head can be switched between the platform mode and the miter mode. Accordingly, on one hand, the structure for switching between two modes is simple and does not require the cooperation of too many parts; on the other hand, the switchover can be realized simply by manually operating the table, without too many operations, and the operation is very convenient and quick.

DETAILED DESCRIPTION OF THE INVENTION

The present invention will be further described below in detail with reference to the accompanying drawings by embodiments.

As shown in FIGS. 1-6, a preferred embodiment of the compound saw of the present invention is shown. The compound saw comprises a base 1, a housing 2, a transmission component 6, a head component 3 and a table 4.

Figure 2:
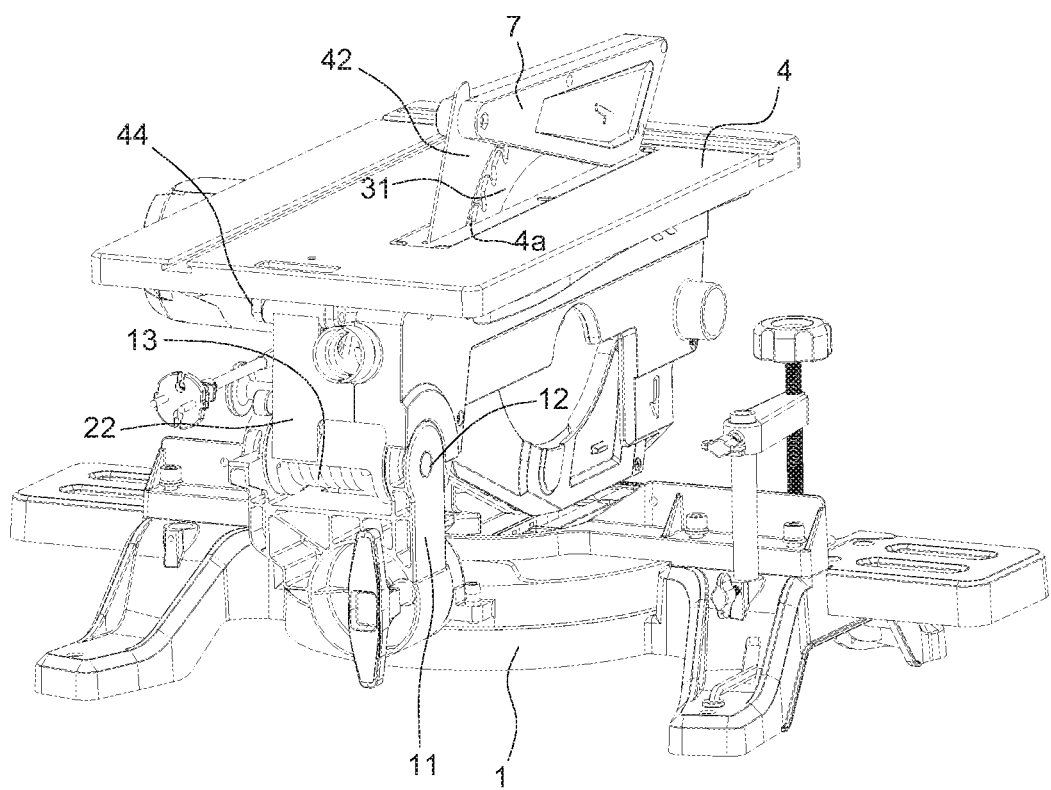
FIG. 2 is another perspective view of the compound saw according to the embodiment of the present invention.
Figure 4:
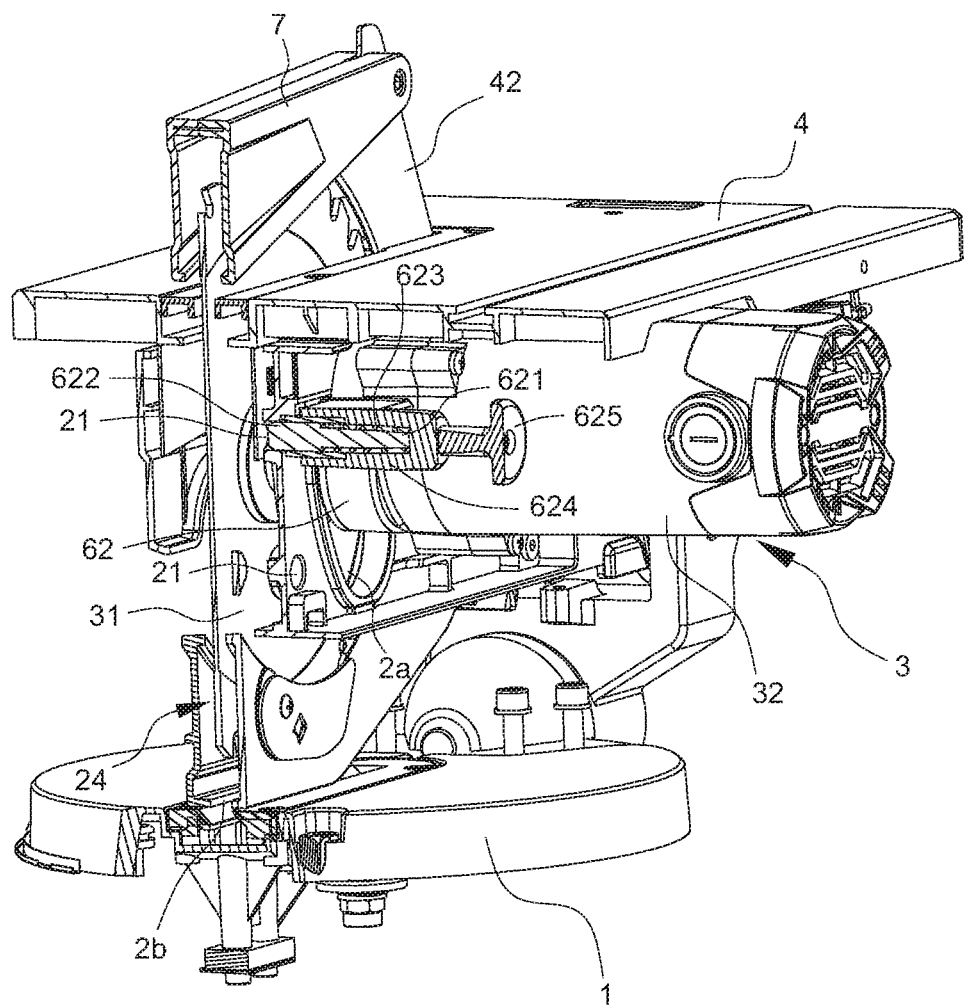
FIG. 4 is a vertical sectional view of the compound saw according to the embodiment of the present invention.

The housing 2 is basically a flat strip box, which is composed of a front box and a rear box, and the housing 2 is hollow and has a chamber 24, a rotatable cutter head 31 for cutting materials is disposed inside the chamber 24, the cutter head 31 usually is a circular saw blade, as shown in FIG. 4. The rear end of the housing 2 is rotatably connected to the base 1, usually through a connecting shaft 12. A U-pattern arm 11 is disposed at the rear portion of the base 1, the rear end of the housing 2 is connected to the arm 11 through the connecting shaft 12, a torsional spring 13 is disposed out of the connecting shaft 12 to keep the housing 2 moving upward, and the front end of the housing 2 is movable vertically relative to the base 1, so as to provide a cutting region below or above the housing 2, as shown in FIG. 2, Certainly, the rotating connecting manner can also be other structures, such as bearings or bolts and nuts and so on.

Figure 1:
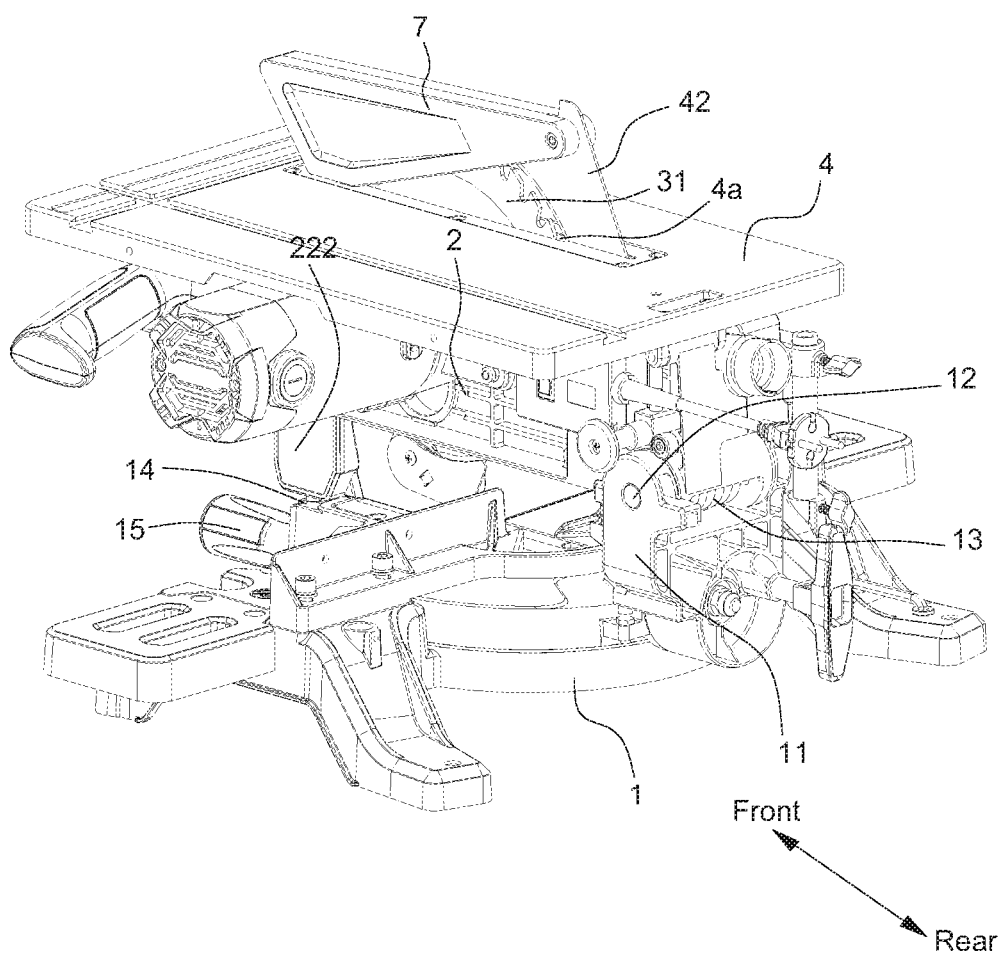
FIG. 1 is a perspective view of a compound saw according to an embodiment of the present invention.
Figure 7:
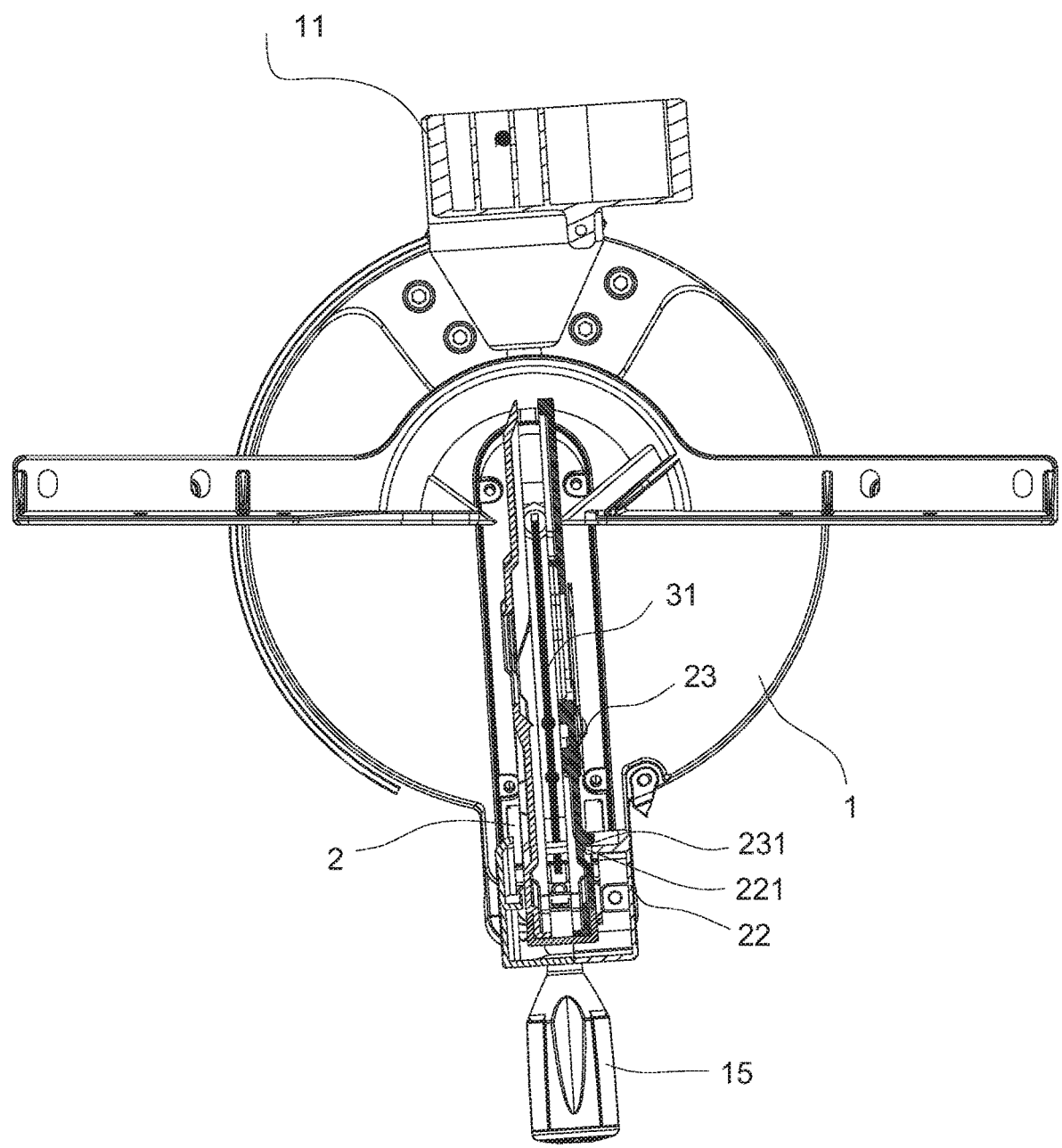
FIG. 7 is a transverse sectional view of the compound saw according to the embodiment of the present invention.

The housing 2 has a first cutting slit 2b at a bottom of the housing 2 for the cutter head 31 to pass through. In this embodiment, the housing 2 comprises a first shell 22 and a second shell 23, the second shell 23 is a cutting machine usually has a cutter shield, the chamber 24 is located inside the first shell 22, and the second shell 23 is hinged with the bottom of the first shell 22, and at least a portion of the second shell 23 is capable of rotating upward and inserting into the chamber 24, usually the second shell 23 hinged with the bottom of the first shell 22 by connecting shafts or axle pins, the front end of the second shell 23 extends into the front end of the first shell 22, and the first shell 22 has a movable protruding slider 221 for guiding and positioning at the front side of the first shell 22, correspondingly, the second shell 23 has a circular arc positioning groove 231 at the front side of the second shell 23 for receiving the protruding slider 221, as shown in FIG. 7, so that, in the process of lifting or pressing, the second shell 23 is able to stretch out and draw back by cooperating with the base 1 or under its own weight, accordingly, the cutter head 31 in non-working area is hidden between the first shell 22 and the second shell 23, and the cutter head 31 in working area is exposed at the bottom of the second shell 23 for cutting, protecting the operators or external matters against touching the rapidly rotating cutter head 31. In this embodiment, to ensure that the second shell 23 cannot cause interference to the cutting things during cutting, the bottom of the second shell 23 is curves upwardly from the front end to the rear end of the housing 2. To make the housing 2 better to support localization, the first shell 22 has a support component 222 at the front end of the first shell 22 extending downward, when the housing 2 is in a horizontal position, the support component 222 is capable of touching the base 1, usually is capable of touching the fastener 14 on the base 1 to open the rotating mechanism on the base 1 when loosen the handle 15, and can adjust the cutting angle through rotating the base 1 horizontally, as shown in FIG. 1.

Figure 5:
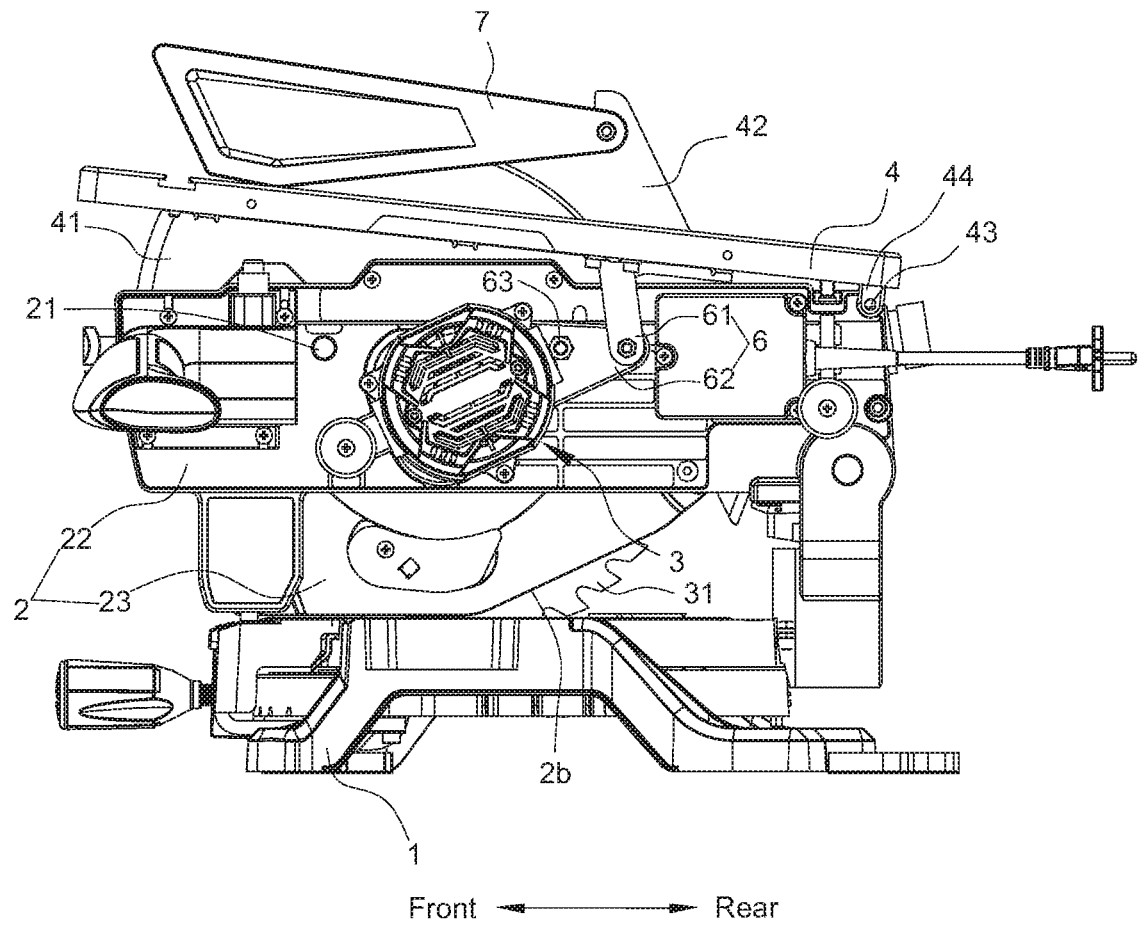
FIG. 5 is a side view of the compound saw in the miter mode according to the embodiment of the present invention.
Figure 6:
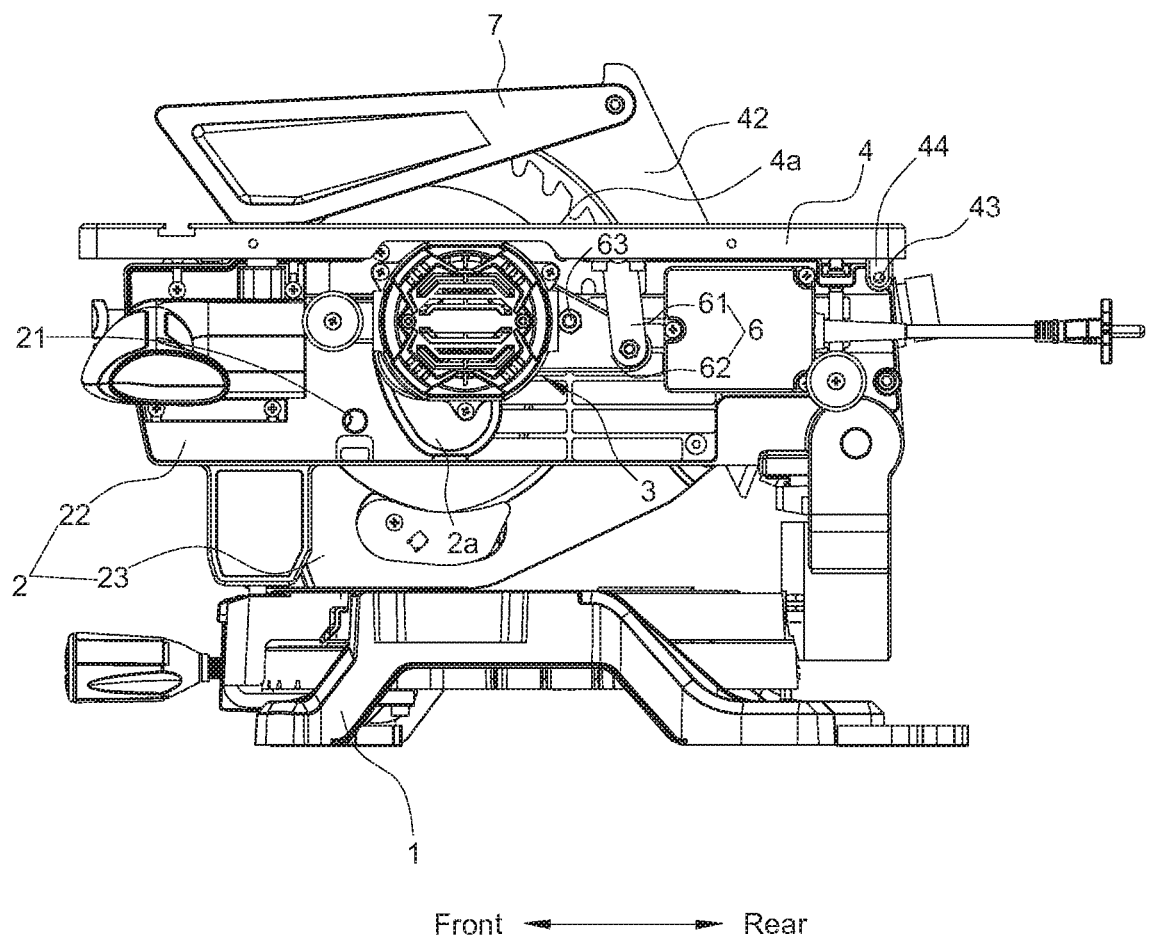
FIG. 6 is a side view of the compound saw in the platform mode according to the embodiment of the present invention.

The table 4 is disposed above the housing 2 as a horizontal work platform, the table 4 has a second cutting slit 4a at a top of the table 4 for the cutter head 31 to pass through, the rear end of the table 4 is rotatably connected to the housing 2, a U-type connecting piece 44 is dispose on the rear end of the table 4, and is rotatably connected to the housing 2 through connecting shafts 43 or axle pins. The table 4 has a protection component 41 extended at the bottom of the table 4, the protection component 41 at least partly located inside the chamber 24, the protection component 41 is a hollow cover, covering the cutter head 31 outside, connecting to the bottom of the table 4, as shown in FIG. 1. When the front end of the table 4 moves upward relative to the housing 2, and the cutter head 31 moves downward relative to the housing 2, so as to expose the cutter head 31 out of the first cutting slit 2b, the compound saw operates in a miter mode, as shown in FIG. 5; when the front end of the table 4 moves downward relative to the housing 2, and the cutter head 31 moves upward relative to the housing 2, so as to expose the cutter head 31 out of the second cutting slit 4a, the compound saw operates in a platform mode, as shown in FIG. 6. To ensure that the cutter head 31 is not exposed when stretching in and out of the second cutting slit 4a, the housing 2 has a connecting portion 42, extending out of the second cutting slit 4a, a protection shield 7 is disposed on the top of the table 4, rotatably connected to the connecting portion 42.

In this embodiment, the transmission component 6 is installed on a lateral face of the housing 2, and connected to the cutter head 31, the table 4 is disposed above the housing 2 as a work platform, the table 4 is engaged with the cutter head 31 through the transmission component 6.

Figure 3:
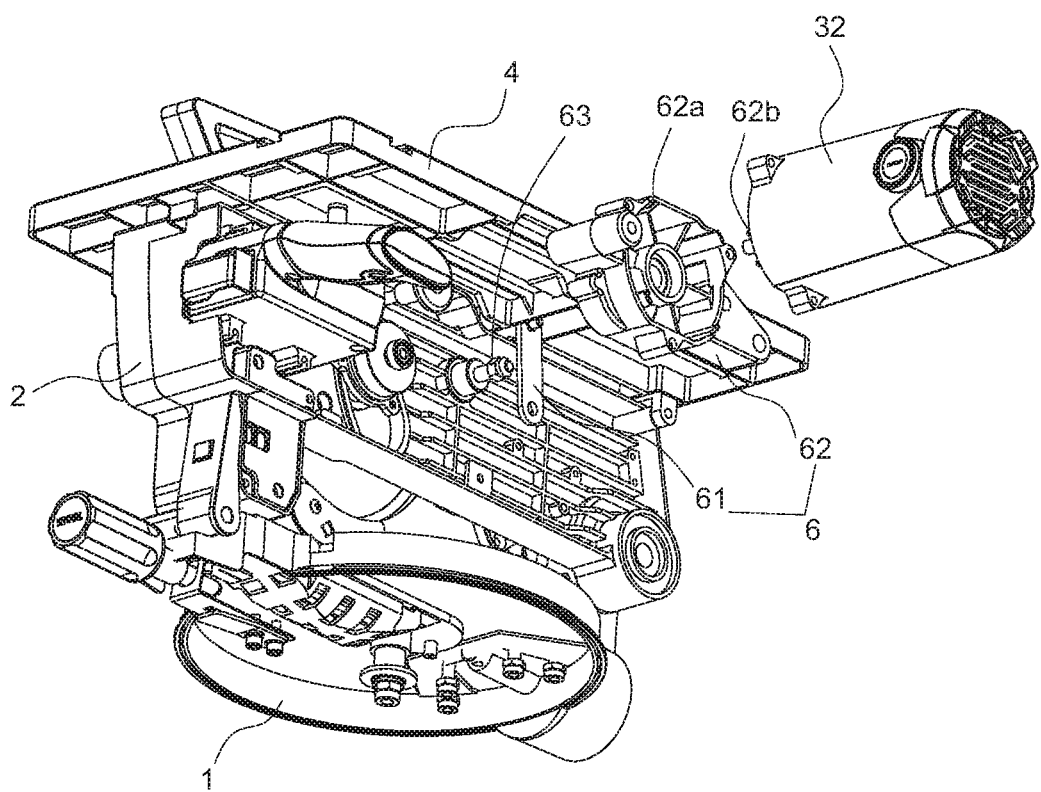
FIG. 3 is an exploded view of the compound saw according to an embodiment of the present invention.
Figure 8:
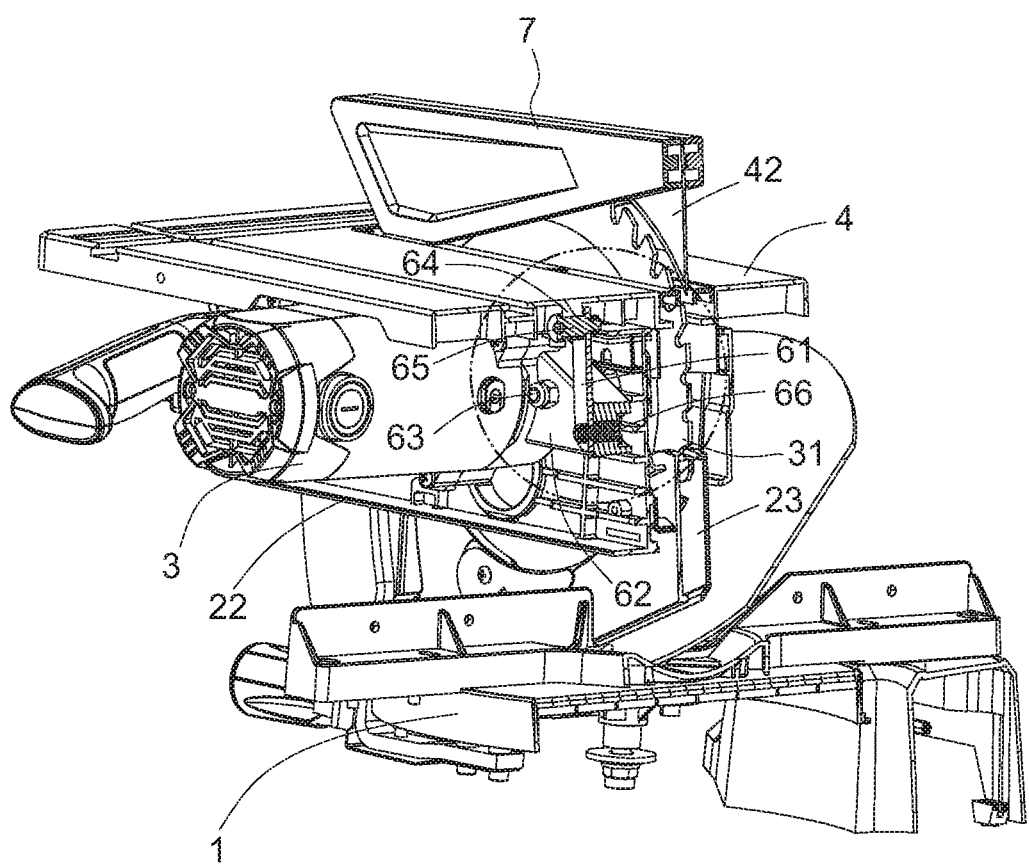
FIG. 8 is a perspective view of the compound saw portion of the compound saw is omitted according to the embodiment of the present invention.

In this embodiment, the transmission component 6 comprises a connecting rod 61 and a slide seat 62 which is capable of adjusting position, the slide seat 62 is similar to the swing arm shape, the middle and rear portion of the slide seat 62 is rotatably connected to the general middle portion of the first shell 22 through bolts and nuts 63 or connecting shafts, it can also be fixed connected through axle pins or bearings, and an evading groove 2a is formed on the middle portion of the first shell 22 to make the connecting driver of the head component 3 and the cutter head 31 sliding and guiding, the evading groove 2a is general waist shape that the upper width is large and the lower width is small, the middle portion and the rear portion which is rotatably connected to the housing 2, the slide seat 62 rotates parallel the housing 2, for better output torque and cooling of the motor, cooling wind leaves 62b are disposed on the middle portion 62a of the slide seat 62, the cooling wind leaves 62b are connected to the output of a driver 32, the driver 32 is fixed on the middle portion 62a by fasteners, and make the output through the middle portion 62a, as shown in FIG. 3. The first end of the connecting rod 61 is hinged to the table 4, an axle seat 64 is disposed on the bottom of the table 4, shaft holes are disposed on the both side of the axle seat 64, and on the upper end of the connecting rod 61, a bolt 65 passes through the axle seat 64 and the upper end of the connecting rod 61 fixed by nuts, so that the upper end of the connecting rod 61 can be rotatably connected to the bottom of the table 4, and the bottom of the connecting rod 61 is hinged to the rear of the slide seat 62 by connecting shafts, axle pins or bolts and nuts, the front end of the slide seat 62 is a free end, and the slide seat 62 can move so as to adjust the position, as shown in FIG. 8. The head component 3 comprises a driver 32 and the cutter head 31, the driver 32 is mounted on the middle portion 62a of the slide seat 62, and is movable vertically along with the slide seat 62 driven by the table 4, so as to make the cutter head 31 be exposed out of the first cutting slit 2b or the second cutting slit 4a, and the driver 32 with an output end is engaged with the cutter head 31 usually through a simple gear set, a big gear and a small gear are disposed on the output of the driver 32 and the shaft of the cutter head 31 and engaged with each other, certainly it can also drive by using other speed change mechanism. To avoid the housing 2 causing interference to the head component 3 when the head component 3 is moving, an evading groove 2a is formed on the housing 2, which allows the output end of the driver 32 to pass therethrough and can evade the output end of the driver 32 during the rotation of the movable bench 4 relative to the housing 2, to cooperate with the swinging of the head component 3, the evading groove 2a is a curved arc groove curving toward the rear end of the housing 2, as shown in FIG. 3, FIG. 5-6.

To ensure that the cutter head 31 after switching to the corresponding cutting mode can maintain a stable working state, the housing 2 has a positioning hole 21 for positioning the cutter head 31 when the cutter head 31 moves to a corresponding position, the positioning hole 21 runs through a wall of the housing 2 along the direction of the thickness of the housing 2, usually there are two positioning holes 21 distributing on an arc line, one of the two positioning holes 21 is corresponding to the positions of the cutter head 31 under a platform mode, and the other one is corresponding to the positions of the cutter head 31 under a miter mode. Correspondingly, the slide seat 62 has a positioning column seat 624 at the front end of the slide seat 62, a positioning column 621 matched with the positioning hole 21 is movable disposed inside the positioning column seat 624. A positioning tip 622 that can be accommodated in the positioning hole 21 is further arranged on the positioning column 621. The positioning tip 622 can slide back and forth in an axial direction of the positioning column 621. An elastic member 623 is further arranged in the positioning column 621, the elastic member 623 can be a spring, one end of the elastic member 623 is resisted against the positioning tip 622, and the other end of the elastic member 623 is resisted against the chamber of the positioning column seat 624, so as to force the positioning tip 622 of the positioning column 621 to insert into the positioning hole 21, the rear end of the positioning column 621 extends out of the positioning column seat 624 and connected to an operation handle 625, as shown in FIG. 4.

The principle of using the compound saw is described below.

The base 1 of the compound saw is fixed on an operating platform, and the movable bench 4 is pulled upward to the first position. At this time, the positioning tip 622 of the positioning column 621 will enter and be locked in the positioning hole 21 corresponding to the first position under the action of the elastic member 623. At this time, the movable bench 4 rotates up and drives the connecting rod 61 to pull up the first end of the slide 62. Since the middle portion of the slide 62 is hinged to the housing 2, the second end of the slide 622 is pressed down. The head component 3 moves down synchronously in the process of pressing down the slide 62 since the driver 32 and the cutter head 31 are coaxially connected to the second end of the slide 62. In this way, the cutter head 31 can be exposed under the first cutting slit 2b, and the whole compound saw is switched to the miter mode. The raw material to be cut is fed from a gap between the base 1 and the housing 2, and then cut. The first end of the housing 2 is connected to the base 1 in such a way that the first end of the housing 2 can rotate up and down, so the cutting angle can be adjusted during cutting, as shown in FIG. 5.

When it is required to switch to the platform mode, the movable bench 4 is pressed down, the positioning tip 622 is disengaged from the positioning hole 21 corresponding to the first position, and the elastic member 623 is compressed. When the movable bench 4 is moved to the second position, the positioning tip 622 of the positioning column 621 will enter and be locked in the positioning hole 21 corresponding to the second position due to the elastic resilience of the elastic member 623. The movable bench 4 rotates up and drives the connecting rod 61 to press down the first end of the slide 62. Since the middle portion of the slide 62 is hinged to the housing 2, the second end of the slide 62 is pulled up. The driver 32 and the cutter head 31 both in the head component 3 move up synchronously in the process of pressing down the slide 62 since the driver 32 and the cutter head 31 are coaxially connected to the second end of the slide 62. In this way, the upper portion of the cutter head 31 is exposed from the housing 2. Since the movable bench 2 is flush with the housing 2 at this time, the upper side of the cutter head 31 is actually exposed to the movable bench 4, and the cutter head 31 under the second cutting slit 4a is hidden in the second cutting slit 4a. Thus, the whole compound saw is switched to the platform mode, as shown in FIG. 6.

The invention claimed is:

1. A compound saw, comprising a base, a housing having an internal chamber, a cutter head disposed inside the chamber, a transmission component and a table;
wherein, the housing has a front end and a rear end, the rear end of the housing is rotatably connected to the base, the front end of the housing is movable vertically relative to the base, so as to provide a cutting region below or above the housing;
the housing has a first cutting slit at a bottom of the housing for the cutter head to pass through;
the transmission component is installed on a lateral face of the housing, and connected to the cutter head;
the table is disposed above the housing as a work platform, the table has a second cutting slit at a top of the table for the cutter head to pass through, and the table engages the cutter head through the transmission component;
the table has a front end and a rear end, the rear end of the table is rotatably connected to the housing, and
when the front end of the table moves upward relative to the housing, so as to expose the cutter head out of the first cutting slit, the compound saw operates in a miter mode;
when the front end of the table moves downward relative to the housing, so as to expose the cutter head out of the second cutting slit, the compound saw operates in a platform mode.

2. The compound saw of claim 1, wherein the transmission component comprises a connecting rod having a first end and a second end, and a slide seat having a front end, a rear end, a middle portion and a rear portion which is rotatably connected to the housing, the slide seat rotates parallel the housing;
the first end of the connecting rod is hinged to the table, the second end of the connecting rod is hinged to the rear end of the slide seat, and the front end of the slide seat is a free end.

3. The compound saw of claim 2, further comprises a head component, the head component comprises a driver and the cutter head;
the driver is mounted on the middle portion of the slide seat, and is movable vertically along with the slide seat driven by the table, so as to expose the cutter head out of the first cutting slit or second cutting slit;
and the driver has an output end, the output end is engaged with the cutter head.

4. The compound saw of claim 3, wherein the housing has an evading groove which allows the output end of the driver to pass therethrough and is capable of evading the output end of the driver during the rotation of the table relative to the housing.

5. The compound saw of claim 4, wherein the evading groove is a curved arc groove curving toward the rear end of the housing.

6. The compound saw of claim 2, wherein the housing has a positioning hole for positioning the cutter head when the cutter head moves to a corresponding position, the positioning hole runs through a wall of the housing along the direction of the thickness of the housing;
and correspondingly, the slide seat has a positioning column seat at the front end of the slide seat, a positioning column having a positioning tip matched with the positioning hole is movably disposed inside the positioning column seat, an elastic member is disposed out of the positioning column so as to force the positioning tip of the positioning column to insert into the positioning hole;
the rear end of the positioning column extends out of the positioning column seat and connected to an operation handle.

7. The compound saw of claim 1, wherein the housing comprises a first shell and a second shell disposed below the first shell;
the chamber is located inside the first shell, and the second shell is hinged with the bottom of the first shell, and at least a portion of the second shell is capable of rotating upward and inserting into the chamber to protect the cutter head.

8. The compound saw of claim 7, wherein the first shell has a movable protruding slider for guiding and positioning at the front side of the first shell, correspondingly, the second shell has a circular arc positioning groove at the front side of the second shell for receiving the protruding slider, so that, the cutter head in non-working area is hidden between the first shell and the second shell, and the cutter head in working area is exposed at the bottom of the second shell for cutting.

9. The compound saw of claim 8, wherein the table has a protection component extended at the bottom of the table, the protection component at least partly located inside the chamber, the protection component is a hollow cover, covering the cutter head outside, connecting to the bottom of the table.

10. The compound saw of claim 8, wherein the housing has a connecting portion, extending out of the second cutting slit;
a protection shield is disposed on the top of the table, rotatably connected to the connecting portion.

11. The compound saw of claim 8, wherein the bottom of the second shell is curved upwardly from the front end to the rear end of the housing, and the first shell has a support component at the front end of the first shell extending downward, when the housing is in a horizontal position, the support component is capable of touching the base.

12. The compound saw of claim 3, wherein cooling wind leaves are disposed on the middle portion of the slide seat, the cooling wind leaves are connected to the output end of the driver.

13. The compound saw of claim 4, wherein cooling wind leaves are disposed on the middle portion of the slide seat, the cooling wind leaves are connected to the output end of the driver.

14. The compound saw of claim 5, wherein cooling wind leaves are disposed on the middle portion of the slide seat, the cooling wind leaves are connected to the output end of the driver.

* * * * *